July 31, 1934.  W. M. SCHULTZ  1,968,786
COOKING VESSEL
Filed Jan. 16, 1932
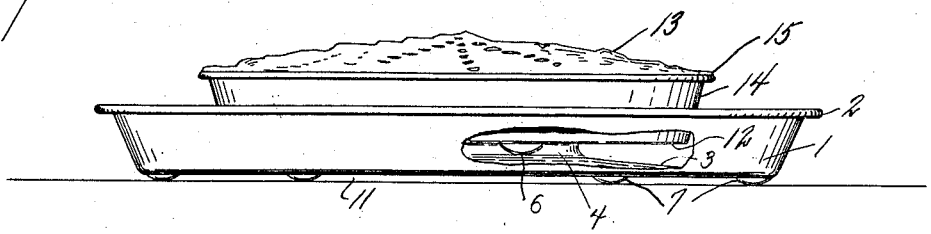
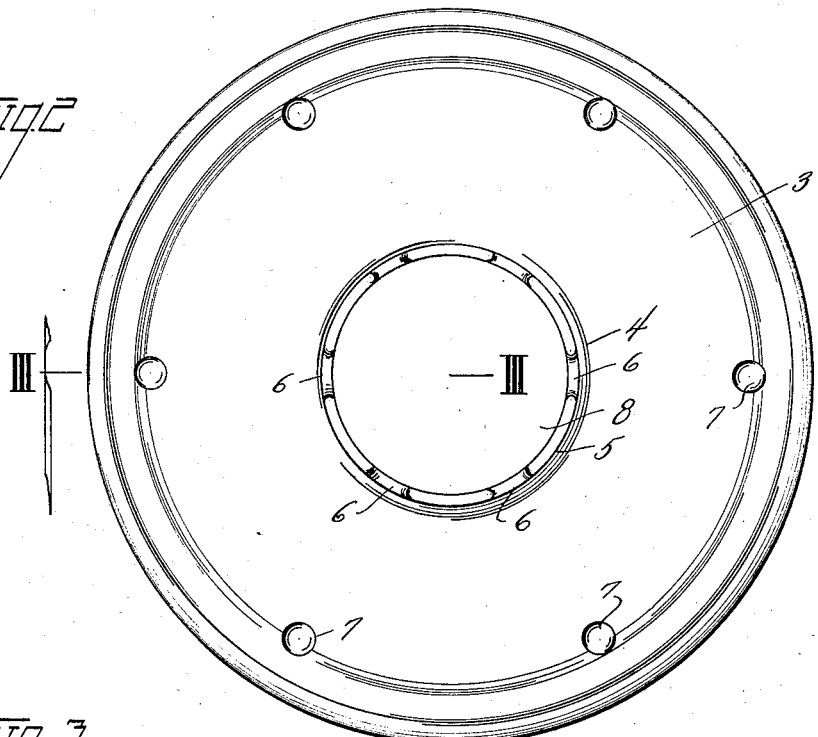
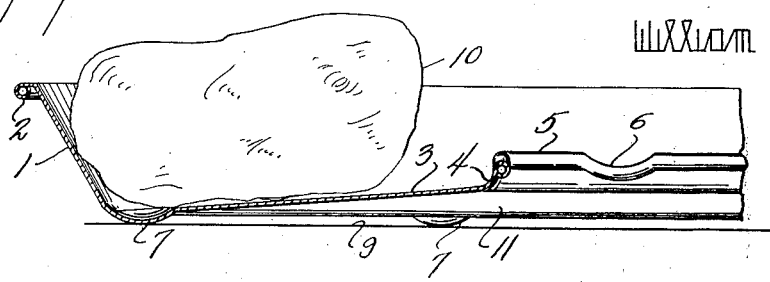
William M. Schultz
Inventor
By
Attorney Patented July 31, 1934

1,968,786

UNITED STATES PATENT OFFICE 1,968,786

COOKING VESSEL

William M. Schultz, Toledo, Ohio, assignor to William F. Oberle, Toledo, Ohio

Application January 16, 1932, Serial No. 587,056

1 Claim. (Cl. 53—6)

This invention relates to baking or cooking accessories.

This invention has utility when incorporated in ring pans for sustaining pie dishes and catching any overflow, as well as providing a mounting for articles directly as in being prepared for food.

Referring to the drawing:

Fig. 1 is a side elevation, with parts broken away, showing an embodiment of the invention in use as a pie dish sustainer during the baking of the pie, in order that overflow from the pie dish may not burn in the oven;

Fig. 2 is a plan view of the ring vessel or dish of Fig. 1; and

Fig. 3 is a section on the line III—III, Fig. 2.

This vessel proper is shown comprising outer flare portion 1 terminating in outer bead 2 as a major rim. From the base of this rim 1 there extends inwardly and upwardly, bottom or vessel portion 3 as the receiver which, at its inner portion, terminates in minor rim 4 upwardly extending to bead 5. This rim 4 has major portions 5 and intermediate depressions or dip portions 6. Between the rim 1 and rim 4, there is the main receiver of this vessel draining normally outward toward the rim 1. This bottom 3, adjacent the rim 1, has depending bosses 7 forming feet. There is accordingly provided a ring shaped vessel having central opening 8, upwardly through which heat drafts may flow when the vessel is located on bottom 9 of an oven. This vessel or support may be a receiver directly for articles in the instance, say of baking potatoes 10 or even rolls or other articles.

In instances of substances to be cooked, wherein direct contact of the vessel with the oven bottom 9 might tend to burn, a spacing clearance 11 provided by this ring vessel, between the oven 9 and bottom 12 of the secondary vessel or the one directly holding the substance to be cooked, as pie 13, reduces the hazard from burning the pie bottom.

Normally with pie, pie dish sides 14 have the filler and crust close to the top 15. Especially with fruits or juicy pies, during the cooking, there is a tendency to boil or expand, which to some extent is taken care of in the rise of the upper crust. However, in many instances, this substance oozes over the rim 15, and when such is allowed to run down the outside of the side 14, and directly contact with the oven bottom 9, burning occurs with objectionable odors and considerable difficulty in cleaning up. In this instance of this auxiliary ring vessel to sustain the pie dish bottom 12, the pie dishes of a wide range of sizes may be adopted, and even meat pies and other combinations of baking is supported. There is accordingly a uniform temperature throughout the vessel directly carrying the pie or other substance. This is a factor for uniform cooking action and against excess heating or burning in a particular part, as the bottom. Furthermore, there may be no difficulty as to the amount of juice content for the pie, in that the overflow is retained by the ring vessel, and accordingly is not a charred residue for difficulty in cleaning the oven.

This ring vessel is sightly, has a wide range of uses which may be direct or accessory, and is a material factor in contributing to oven upkeep and cleanliness.

This ring shaped vessel for cooking utensils, while it may be used as a sub-base for pie or other cooking dishes may, as explained, be used directly as a container for substances to be baked or cooked. The configuration of the vessel or ring is such that any oozings or grease from the substances undergoing heat treatment may drain down toward the outer rim of the ring vessel.

What is claimed and it is desired to secure by United States Letters Patent is:

A receiver of ring form having inner and outer upwardly extending rims terminating in beads, the outer rim flaring and being higher than the inner rim, said inner rim having portions for sustaining a vessel on said inner rim, and intermediate depressions for ventilation about the bottom of the sustained vessel from within the inner rim to between said rims, said receiver between said rims forming a vessel deepening toward the outer rim and there terminating in depending bosses as feet for the receiver.

WILLIAM M. SCHULTZ.